(12) United States Patent
Jordan et al.

(10) Patent No.: US 9,187,289 B1
(45) Date of Patent: Nov. 17, 2015

(54) APPARATUS FOR LIFTING AND SUPPORTING AN ITEM FOR HOLDING WINDABLE MATERIAL

(71) Applicants: Michael C. Jordan, Knoxville, TN (US); David S. Jordan, Knoxville, TN (US)

(72) Inventors: Michael C. Jordan, Knoxville, TN (US); David S. Jordan, Knoxville, TN (US)

(73) Assignee: iTool Equipment Holding LLC, Knoxville, TN (US)

( * ) Notice: Subject to any disclaimer, the term of this patent is extended or adjusted under 35 U.S.C. 154(b) by 21 days.

(21) Appl. No.: 13/986,407

(22) Filed: Apr. 29, 2013

Related U.S. Application Data

(60) Provisional application No. 61/642,220, filed on May 3, 2012.

(51) Int. Cl.
*F16M 11/24* (2006.01)
*B65H 75/02* (2006.01)

(52) U.S. Cl.
CPC ....................................... *B65H 75/02* (2013.01)

(58) Field of Classification Search
CPC ....... B65H 75/02; B65H 49/32; B65H 49/325
USPC ............ 248/188.2, 125.8; 242/588, 591, 557, 242/559.4
See application file for complete search history.

(56) References Cited

U.S. PATENT DOCUMENTS

| | | | | |
|---|---|---|---|---|
| 3,325,120 | A * | 6/1967 | Brinkman | 242/557 |
| 3,833,997 | A * | 9/1974 | Kaddatz et al. | 29/267 |
| 4,095,706 | A * | 6/1978 | Schwien et al. | 414/24.6 |
| 4,752,047 | A * | 6/1988 | Franks, Jr. | 242/129.6 |
| 5,297,779 | A * | 3/1994 | Collins et al. | 254/98 |
| 5,388,782 | A * | 2/1995 | King | 242/557 |
| 7,861,829 | B1 * | 1/2011 | Coursey | 188/31 |
| 8,403,250 | B1 * | 3/2013 | Callahan | 242/403.1 |
| 8,727,361 | B2 * | 5/2014 | Jordan et al. | 280/47.131 |
| 2006/0219836 | A1 * | 10/2006 | Shetler | 242/588 |
| 2008/0066808 | A1 * | 3/2008 | Stein | 137/355.12 |
| 2009/0065663 | A1 * | 3/2009 | Jordan et al. | 248/157 |
| 2010/0230528 | A1 * | 9/2010 | Singleton | 242/588 |
| 2011/0139921 | A1 * | 6/2011 | Wierstra | 242/591 |

* cited by examiner

*Primary Examiner* — Monica Millner
(74) *Attorney, Agent, or Firm* — Michael E. McKee (57) ABSTRACT

Apparatus for lifting and supporting a spool of windable material above a floor includes a pair of supports wherein each support includes a floor-engaging base and an elongated telescoping post assembly joined to the base so as to extend vertically upwardly therefrom. A lift assembly is connected to the post assembly and is releasably securable at alternative locations therealong, and the telecoping post assembly can be altered in length so that by positioning each of the supports adjacent a corresponding end of the barrel of the spool, arranging the lift assemblies of the stands in cooperating relationship with the barrel of the spool so that when lifted by the stands, the weight of the spool rests upon the lift assemblies, and then lengthening the post assembly, the spool is lifted from the floor by way of the lift assemblies.

18 Claims, 5 Drawing Sheets

APPARATUS FOR LIFTING AND SUPPORTING AN ITEM FOR HOLDING WINDABLE MATERIAL

The benefit of Provisional Application Ser. No. 61/642,220, filed May 3, 2012, is hereby claimed. The disclosure of this referenced provisional patent application is incorporated herein by reference.

BACKGROUND OF THE INVENTION

This invention relates generally to material handling apparatus and relates, more particularly, to apparatus used to lift and support an item, such as a spool about which material is wound or can be wound, as the item is rotated for the purpose of either unwinding the material from the item or winding the material about the item.

At a construction job site, an item, such as a relatively large spool of coiled material, such as wire or cable, is commonly desired to be supported above a floor to facilitate the unwinding of material from the spool or the winding of material about the spool. For these purposes, there exists a class of apparatus including a pair of stands which are positionable on opposite sides of the spool and are capable of lifting the opposite sides of the spool from the floor to a desired elevated position. Heretofore, however, the stands of the prior art apparatus have not possessed the capacity to support a spool having a diameter within a relatively large range of diameters thereby requiring that a number of different-sized stands be on hand if spools of different diameter are to be lifted and supported. Furthermore and inasmuch as a spool is more easily unwound if its axis of rotation is oriented substantially horizontally, stands of the prior art are commonly limited in their capacity to support a spool for rotation about a substantially horizontal axis if the underlying ground or floor is not substantially level. Still further, such prior art stands are commonly susceptible to tipping over during use.

It would be desirable to provide an apparatus including a pair of stands positionable on opposite sides of an item, such as a spool for holding windable material, for lifting the item from the floor to an elevated condition at which the item can be rotated during either a material unwinding process or a material winding process. Moreover, it would also be desirable to provide the pair of stands with a capability for lifting and supporting a spool within a relatively broad range of spool sizes (i.e. diameters) and which strongly resists a tendency to tip over during use.

Accordingly, it is an object of the present invention to provide a new and improved apparatus of the aforedescribed class for lifting and supporting an item, such as a spool for holding windable material, to facilitate the rotation of the item for the purpose of unwinding material from the item or winding material about the item.

Another object of the present invention is to provide such an apparatus which is well-suited for supporting an item for rotation about a substantially horizontal axis, even if the underlying ground or floor is not level.

Still another object of the present invention is to provide such apparatus which can be used to lift and support a spool having a diameter within a relatively large range of spool diameters.

Yet another object of the present invention is to provide such an apparatus which is uncomplicated in structure, yet effective in operation, is relatively lightweight and easy to use, resists tipping over during use and has a relatively high load-carrying capacity.

SUMMARY OF THE INVENTION

This invention resides in an apparatus for lifting and supporting an item from an underlying floor wherein the item includes a centrally-disposed barrel having two opposite ends and about which a windable material is either wound or can be wound.

The apparatus includes a pair of supports wherein each support includes a floor-engaging base and an elongated telescoping post assembly. The telescoping post assembly has two opposite ends, an inner tube section which provides one end of the two opposite ends of the post assembly and an outer tube section which provides the other of the two opposite ends of the post assembly. One of the two opposite ends of the post assembly is connectable to the floor-engaging base for support of the post assembly in a substantially vertical orientation with respect thereto, and the inner and outer tube sections are movable with respect to one another to alter the spaced distance between the two opposite ends of the telescoping post assembly. Each stand also includes a lift assembly which is connected to the other of the opposite tube sections and which is cooperable with a corresponding end of the barrel of the item so that when the stand supports the spool, at least a portion of the weight of the item rests upon the lift assembly. In addition, each stand includes means for moving the inner and outer tube sections of the telescoping post assembly relative to one another so that the two opposite ends of the post assembly are moved further apart and so that by positioning each of the supports adjacent a corresponding end of the barrel of the item, arranging the lift assemblies of the stands in cooperating relationship with the barrel of the item so that when lifted by the stands, the weight of the item rests upon the lift assemblies, and then moving the inner and outer tube sections relative to one another so that the opposite ends of the telescoping post assembly are moved further apart, the item is lifted from the floor by way of the lift assemblies.

DETAILED DESCRIPTION OF AN ILLUSTRATIVE EMBODIMENT

Figure 1:
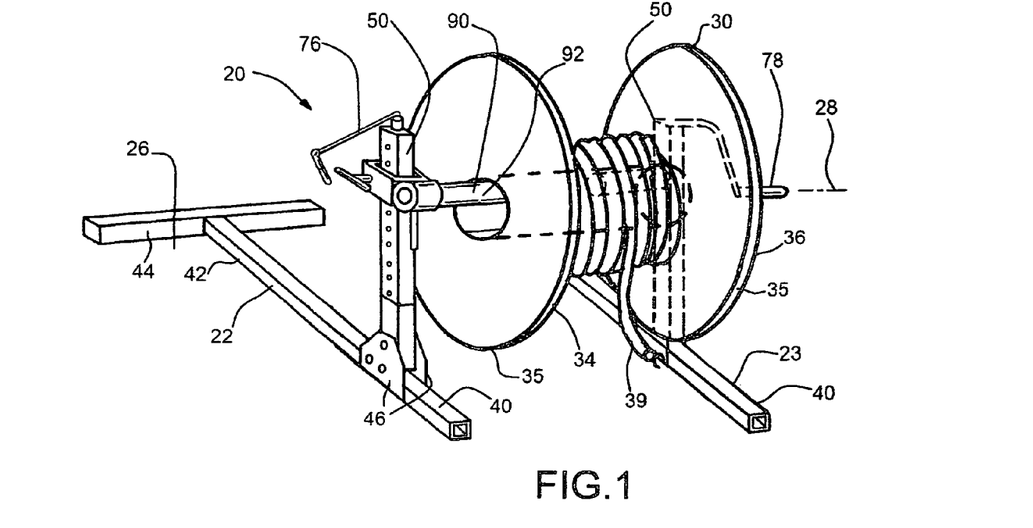
FIG. 1 is a perspective view of a two-stand apparatus within which features of the invention are embodied shown being used to support a spool of windable material above a floor.
Figure 2:
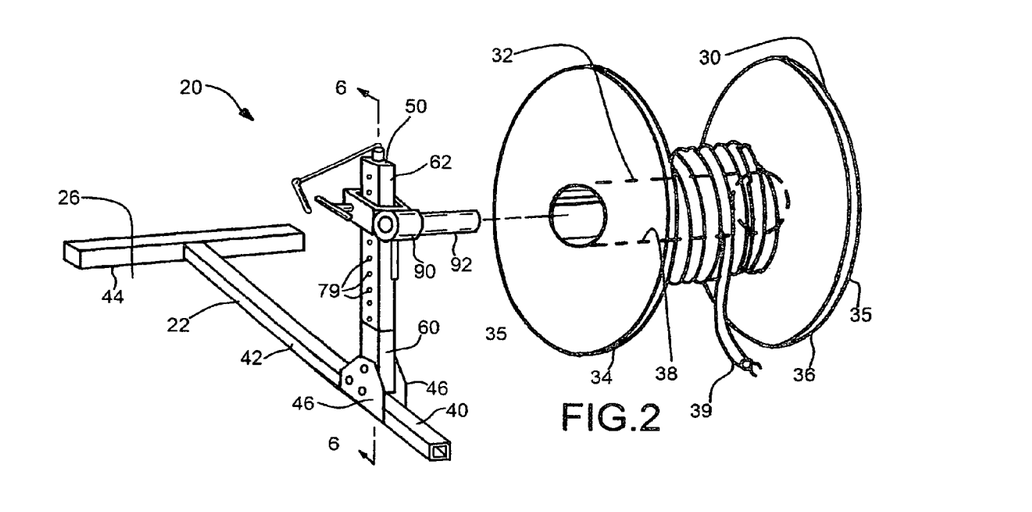
FIG. 2 is a perspective view of one of the stands of the apparatus and the spool of FIG. 1, shown removed from one another.

Turning now to the drawings in greater detail and considering first FIGS. 1 and 2, there is illustrated an embodiment of an apparatus, generally indicated 20, including of a pair of stands 22, 23 within which features of the present invention are embodied and shown being used for supporting a spool 30 of wound material 39, such as electrical wire or cable, in an elevated condition above an underlying floor 26 so that the spool 30 can be rotated about a substantially horizontal axis for the purposes of unwinding the material 39 from the spool 30 or for winding the material 32 about the spool 32. Each stand 22 or 23 of the apparatus 20 is positionable on the opposite sides of the spool 32 and cooperates with the spool 30 in a manner enabling the spool 36 to be lifted by the stand 22 or 23 to an elevated position above the floor 26. Together, the stands 22 and 23 support the spool 30 above the floor 26 for rotation about a substantially horizontal axis. As will be apparent herein, the stands 22, 23 of the apparatus 20 provide a convenient means by which a relatively heavy spool 30 can be manipulated into an elevated condition above the floor 26 for the purpose of unwinding material 39 from the spool 30 or winding material 39 about the spool 30.

With reference still to FIGS. 1 and 2, there is illustrated a spool 30 of a class of spools which can be lifted and supported by the stands 22, 23. Briefly, the spool 30 includes a centrally-disposed, hollow elongated barrel 32 about which a length of coiled material 39, such as electrical wire, steel cable, or rope or flexible sheet material, such as flexible flooring material, is wound and includes a pair of disc-like flanges 34, 36 attached to the opposite ends of the barrel 32 on the opposite sides of the spool 30. Each flange 34 or 36 is circular in form and defines a cylindrical rim 35 along its peripheral edge. Furthermore, there is commonly provided a bore 38 which extends through the center of both flanges 34, 36 and the elongated barrel 32. In addition, the bore 38 defines an elongated axis 28 about which the spool 30 is rotated as the spool 30 is supported by the apparatus 20 in an elevated condition above the floor 26 to facilitate the unwinding of the material 39 about the spool 30 or winding of the material 39 about the spool 30.

With reference to FIGS. 1-4, each of the stands 22 or 23 includes a floor-engaging base 40 having a lengthy elongated member 42 and a shorter member 44 which is joined to one end of the elongated member 42 to form a T which overlies the floor 26 when placed thereon. Each member 42 or 44 of the depicted stand 22 or 23 is constructed of steel channel having a substantially square cross section, and the members 42 and 44 are joined to one another with welds. Each base 40 further includes a pair of plates 46 which are disposed on opposite sides of the elongated member 42 and positioned at a location along the length of the member 42 which is situated about one-third of the total distance of the elongated member 42 as measured from the end thereof opposite the elongated member 40 and are attached to the opposite sides of the member 42 with welds. In addition, the plates 46 include portions 48 which extend upwardly from the member 42, as viewed in FIGS. 3 and 4, and these portions 48 are provided with three sets of aligned through-openings 49, 51 and 53 wherein the sets of openings 49 and 51 are vertically disposed with respect to one another and wherein the sets of openings 49 and 53 are horizontally disposed with respect to one another. As will be apparent herein and during use of the stand 22 or 23, the T-shaped formation of the base 40 is positioned flat upon the underlying floor 26 so that the portions 48 of the plates 46 are directed substantially upwardly. Meanwhile, the sets of openings 49, 51 and 53 are utilized in the attachment of the base 40 to other componentry of the stand 22 or 23.

Figure 3:
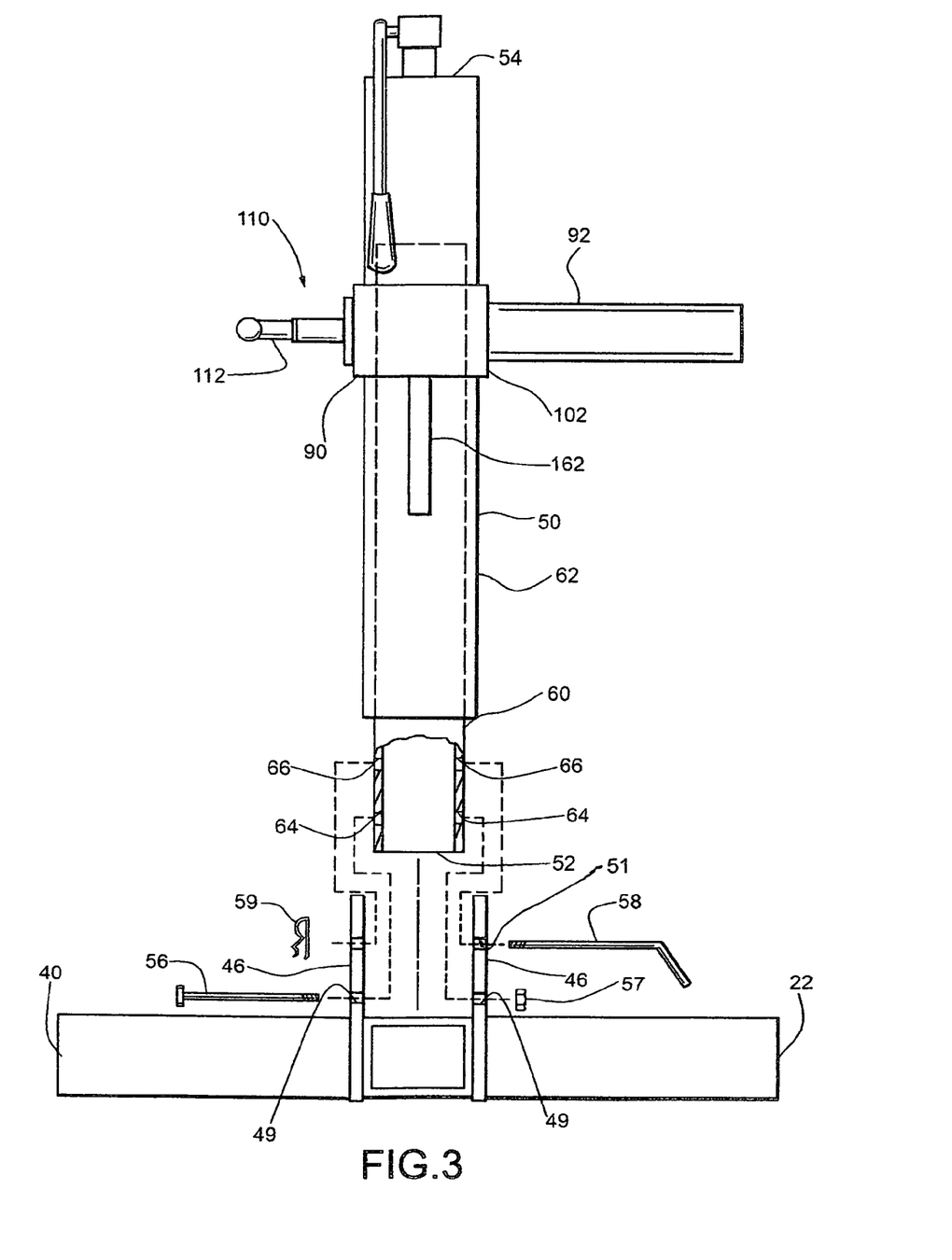
FIG. 3 is an end elevational view of the stand shown in FIG. 2 as seen generally from the right in FIG. 2, shown exploded.
Figure 4:
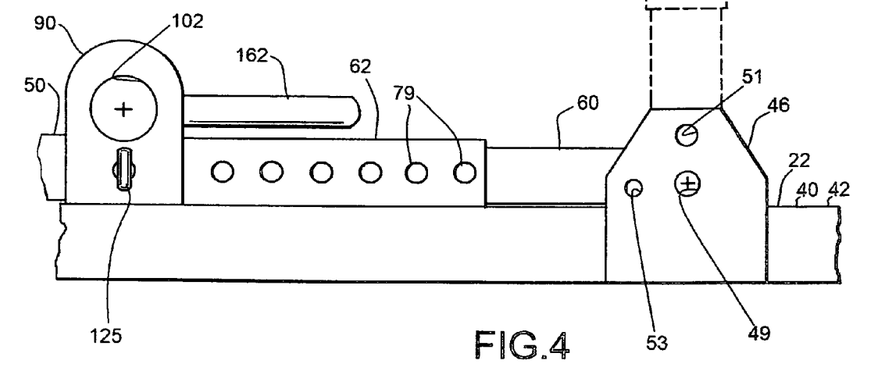
FIG. 4 is a side elevation view of a fragment of the stand of FIG. 2, as seen from the left in FIG. 4 but showing the telescoping tube assembly when positioned in its position for storage.
Figures 5, 6:
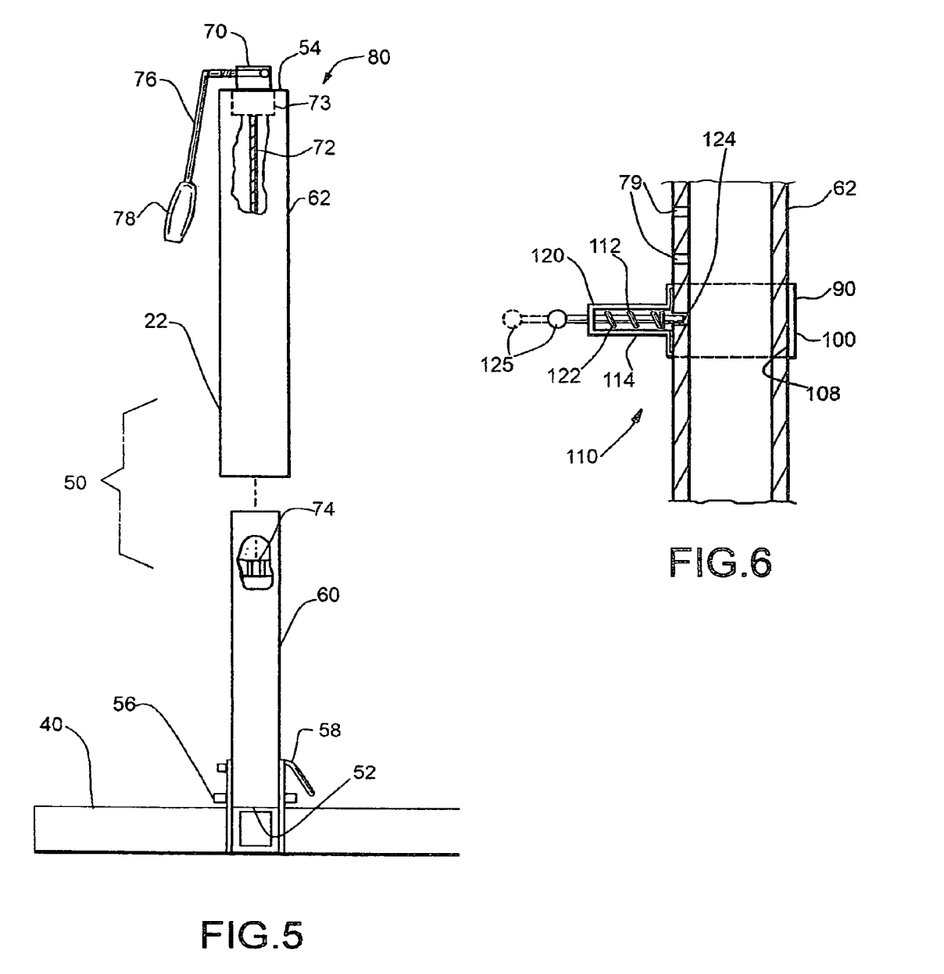
FIG. 5 is an end elevation view of the telescoping tube assembly and base of the FIG. 2 stand, as seen in FIG. 3 and shown partially cut-away.
FIG. 6 is a longitudinal cross sectional view of a stand fragment taken along on line 6-6 of FIG. 2.

As best shown in FIGS. 3-5, each stand 22 or 23 further includes an elongated telescoping post assembly 50 having two opposite ends 52 and 54 and which is joined at one end 52 to the floor-engaging base 40. Each telescoping post assembly 50 includes a hollow inner tube section 60 (which provides the end 52 of the assembly 50) and a hollow outer tube section 62 (which provides the end 54 of the assembly 50), and at least a portion of the inner tube section 60 is accepted by the hollow interior of the outer tube section 62 through an open end thereof. The inner and outer tube sections 60 and 62 are sized to permit the tube sections 60 and 62 to telescopically move relative to one another and thereby permit the spaced distance between the ends 52, 54 of the tube assembly 50 to be altered. Within the depicted apparatus 20, each inner and outer tube sections 60 and 62 are comprised of steel tubing having a substantially square cross section.

For attachment of the telescoping post assembly 50 to the floor-engaging base 40, the inner tube sections 60 defines a set of aligned openings 64 disposed adjacent the end 52 of the assembly 50, and the inner tube sections 60 is positioned between the plates 46 of the base 40 so that its openings 64 are aligned with the set of openings 49 of the plates 46. The tube assembly 50 is connected to the base 40 with a bolt 56 whose shank extends through the aligned sets of openings 49 and 64 and which is secured therethrough with a nut 57.

The telescoping tube assembly 50 is pivotally movable relative to the base 40 about the bolt 56 between a position of use as shown in FIGS. 1-3 and in phantom in FIG. 4 at which the tube assembly 50 extends substantially vertically upwardly from the base 40 and a position for storage as seen in solid lines in FIG. 4 at which the tube assembly 50 overlies and is arranged substantially parallel to the elongated member 42 of the base 40. For purposes of securing the tube assembly 50 in either of the aforedescribed position for use or the position for storage, the inner tube section 60 further defines a set of aligned openings 66 (FIG. 3) which are spaced from the openings 64 and which are aligned with the sets of openings 51 or 53 of the plates when the tube assembly 50 is positioned in a corresponding one of its position of use and its position for storage.

More specifically, when the tube assembly 50 is disposed about the bolt 56 in its FIG. 4 phantom-line position (of use) at which the tube assembly 50 extends vertically upwardly from the base 40, the set of openings 56 are aligned with the set of plate openings 51; and when the tube assembly 50 is disposed about the bolt 56 in its FIG. 4 solid-line position (for storage) at which the tube assembly 50 is arranged substantially parallel to the elongated member 42 of the base 40, the set of openings 66 are aligned with the sets of plate openings 53. A pin 58 (with a key 59) is used to secure the tube assembly 50 in its position of use or in its position for storage by directing the pin 58 endwise through the aligned sets of openings 51, 66 or the aligned sets of openings 53, 66. In addition, the outer tube portion 62 defines a series of indentations 79 along one side member thereof for a reason which will become apparent herein.

It is a feature of the invention that the stands 22 and 23 include means, generally indicated 80 in FIG. 5, for telescopically moving the outer and inner tube sections 60 and 62 relative to one another to thereby alter the distance between the post assembly ends 52 and 54. Within the depicted apparatus 20 and as best shown in FIG. 5, the moving means 80 includes a screw jack assembly 70 associated with each of the telescoping post assemblies 50 enabling a user to mechanically move the opposite ends 52 and 54 of a corresponding post assembly 50 toward and away from one another. As best shown in FIG. 5, each screw jack assembly 70 includes a rotatable screw 72 which is rotatably mounted within the interior of the outer tube section 62 by way of a bearing member 73 mounted adjacent the upper end, as viewed in FIG. 5, of the outer tube section 62 and an internally-threaded nut, or collar member 74, which is fixedly secured within the interior of the inner tube section 60 adjacent the upper end thereof. With the screw 72 threadably accepted by the collar member 74, rotation of the screw 72 in one rotational direction along the length of the outer tube section 62 forcibly moves the opposite ends 52 and 54 of the post assembly 50 away from one another, and rotation of the screw 72 in the opposite rotational direction along the length of the outer tube section 62 forcibly moves the opposite ends 52 and 54 of the post assembly 50 toward one another.

To facilitate the manual manipulation, or rotation, of the screw 72 by a user, there is provided a handle 76 which is joined at one end of the screw 72 (i.e. adjacent the end 54 of the elongated post assembly 50). By grasping the grip, indicated 78, of the handle 76 and then rotating the handle 76 about the bearing member 73, the screw 72 is forced to rotate about its longitudinal axis. The handle 76 is pivotally connected to the screw 72 to facilitate the folding of the stand 22 into a relatively compact unit for storage.

Figure 7:
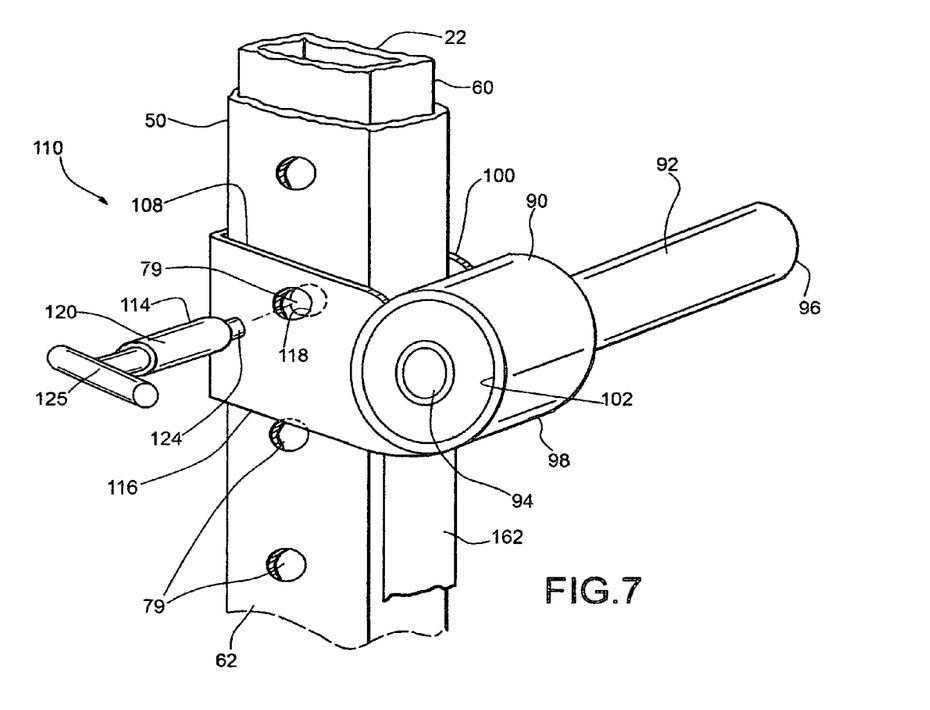
FIG. 7 is a perspective view of a fragment of the stand of FIG. 1, shown exploded.

With reference to FIGS. 6 and 7, it is also a feature of the invention that each stand 22 or 23 includes a lift assembly 90 which is connected to the outer tube section 62 and which is cooperable with a corresponding side of the spool 30 so that when the stands 22 and 23 support the spool 30, the weight of the stand 30 rests upon the lift assemblies 90. Although the lift assemblies 90 can take any of a number of forms, each lift assembly 90 of the depicted stands 22 and 23 include a rotatable arbor, or elongated cylindrical tubular member 92, which can be accepted by the open ends of the barrel 32 of the spool 30 for purposes of lifting the spool 30 from the sides thereof. The tubular member 92 of each stand 22 or 23 is relatively short in length (e.g. no more than about one foot in length), has two opposite ends 94 and 96 and which is joined at one end 94 to the telescoping tube assembly 50 so that the other end 96 of the tubular member 92 extends horizontally to one side of the telescoping tube assembly 50.

For purposes of joining the tubular member end 94 to the telescoping tube assembly 50, there is provided a collar member 98 (within which the tubular member end 94 is positioned) and a bracket 100 which is joined to the collar member 98. The bracket 100 is U-shaped in cross section, and the legs of the bracket 100 are secured, as with welds, to the collar member 98 along one side thereof. Meanwhile, there is interposed between the collar member 98 and the tubular member 92 a bearing assembly 102 which permits the tubular member 92 to rotate about its horizontal axis with relative ease.

The bracket 100 has a central opening 108 which is sized to be closely accepted about the outer tube section 62 when positioned thereover yet permit the bracket 100 to be slidably moved along the length of the outer tube section 62 to alter the position therealong. Furthermore, there is associated with the lift assembly 90 a means, generally indicated 110, for releasably securing the bracket 100 in a fixed position along the length of the outer tube section 62. Within the depicted stands 22 and 23, the means 110 for releasably securing includes an elongated pin 112 which is supported on one side of the bracket 100 for movement into and out of a selected indentation 79 of the series of indentations 79 defined along one side member of the outer tube section 62 (and thus between a position shown in solid lines in FIG. 6 and a position shown in phantom in FIG. 6). In this connection, there is provided pin-supporting hardware 114 which is joined to one side member, indicated 116, of the four side members of the bracket 100, and the side member 116 defines an opening 118 through which an end, indicated 124, of the pin 112 extends. Furthermore, the hardware 114 includes a sleeve member 120 within which the pin 112 is slidably positioned, and a compression spring 122 is disposed about the pin 112 for acting between one end of the sleeve member 120 and the pin 112 so that the pin end 124 is biased toward the outer tube section 62 or, more specifically, into an indentation 79 defined along the outer tube section 62. The pin 112 is provided with a handle 125 which facilitates the manual withdrawal of the pin end 124 from an indentation 98.

To alter the position of the lift assembly 90 along the length of the outer tube section 62, the handle 125 of the pin 112 is pulled (against the biasing force of the compression spring 122) to withdraw the pin end 124 from the indentation 79 within which the pin end 124 is positioned, and then the bracket 100 is slidably moved along the length of the outer tube section 62 to a selected location therealong. At that point, the handle 125 of the pin 112 is released so that the spring 122 is permitted to urge the pin end 124 into an alternative indentation 79 defined along the length of the outer tube section 62 or, more specifically, the indentation 98 situated closest to the location along the length of the outer tube section 62 at which the lift assembly 90 is desired to be secured.

As best seen in FIGS. 4 and 7, each lift assembly 90 is also provided with an elongated grip member 162 which is joined to the underside of the collar member 98 so as to extend generally parallel to the telescoping post assembly 50. The grip member 162 is advantageous in that when the post assembly 50 is secured adjacent the base 40 in its FIG. 4, position for storage, the grip member 162 provides a handle with which the stand 22 or 23 can be carried by a user between sites.

With reference again to FIG. 1 and to use the apparatus 20 for the purpose of lifting and supporting the spool 30 in a stationary position above the underlying floor 26, the spool 30 is oriented upon the floor 26 so that its rims 35 rest upon the floor 26 and the barrel 32 is arranged substantially horizontally. At that point, the stands 22 and 23 (with the telescoping post assemblies 50 securely arranged in the upright, or vertical, position for use) are positioned on opposite sides of the spool 30, and the tubular member 92 of the lift assemblies 90 of each stand 22 or 23 is thereafter directed endwise into a corresponding open end, or bore 38, of the spool barrel 32. It will be understood that in order to position the tubular members 92 of the stands 22 and 23 into horizontal registry with the central bore 38 of the spool 30, the lift assemblies 90 of the stands 22 and 23 may have to be raised or lowered from an initial position along the length of the outer tube section 62 by shifting the bracket 100, as necessary, along the length of the section 62 and re-securing the bracket 100 to the section 62 with the pin 112.

It will also be understood that in order to manipulate the tubular member 92 into a corresponding open end of the spool barrel 38, the stand 22 or 23 must be bodily shifted across the floor 26 as the tubular member 92 is directed endways into an end of the barrel 38. However, neither of the stands 22 or 23 of the depicted apparatus 20 is very heavy (and in fact, weighs no more than about thirty-five pounds) so that the bodily shifting of either stand 22 or 23 across the floor 26 can be effected with relative ease. It also follows that since the tubular member 92 is to be directed into a corresponding open end of the spool barrel 32 when used, the outer diameter of the tubular member 92 is smaller than the inner diameter of the open ends, or bore 38, of the spool barrel 32.

With the tubular members 92 of the stands 22 and 23 positioned within the opposite open ends of the spool barrel 32, the handles 76 of the screw jack assemblies 70 are appropriately rotated to lengthen the telescoping tube assemblies 50, and thus raise the tubular members 92 from the floor 26. It follows that as the tubular members 92 are raised, the spool 30 is raised from the floor 26 as the tubular members 92 press upwardly against the upper surface of the interior of the spool barrel 32. The raising of the tubular members 92 can be halted when the cylindrical rims 35 edges of the spool 30 are lifted from the floor a distance sufficient to accommodate the rotation of the spool 30 about the longitudinal axis of the tubular members 92 without interference with the underlying floor 26.

It will also be understood that because the horizontal level, or height, of the tubular member 92 of each stand 22 or 23 relative to the underlying floor or ground can be set independently of the other stand 23 or 22, the stands 22 and 23 can be adjusted, as necessary, to position the tubular members 92 of the stands 22 and 23 into horizontal registry with one another—no matter how unlevel the underlying floor or ground upon which the stands 22 and 23 are positioned, so that the barrel 32 of the spool 30 can be maintained in a relatively horizontal orientation during a material winding or unwinding process. Thus, the capacity to independently alter the horizontal level of the tubular members 92 of the stands 22 and 23 and position the tubular members 92 of the stands 22 and 23 into horizontal registry with one another and is advantageous in this respect.

It follows from the foregoing that a relatively compact and lightweight device 20 has been described which can be used to lift a spool 30 from the floor 26 and thereafter support the spool 30 while the spool 30 is rotated as material (e.g. a wire or cable) is either unwound from the barrel 32 of the spool 30 or wound about the barrel 32 of the spool 30. Since a spool 30 need only be raised from the underlying floor 26 a distance to permit clearance of the cylindrical rim 35 of the spool 30 as the spool 30 is rotated about the longitudinal axis of its barrel 32, the spool 30 need not be raised very high (e.g. about 0.5 inches) from the floor 26 by the stands 22 and 23.

By way of example, the following dimensions of the depicted apparatus 20 (i.e. its stands 22 and 23) are provided here as follows: The length of the elongated member 42 of the floor-engaging base 40 of each stand 22 or 23 (which provides the length-dimension of the stand 22 or 23) is at least about thirty-six inches long, and is preferably about thirty-seven inches in length; the length of the elongated member 44 of the floor-engaging base 40 of each stand 22 or 23 (which provides the width-dimension of the stand 22 or 23) is about ten inches long; the inner and outer tube sections 60 and 62 of the telescoping post assembly 50 of each stand 22 or 23 have been sized (in length) to be capable of lifting a spool 30 having a diameter within the range of about twenty-two inches and seventy-two inches. That is to say, when the lift assembly 90 is secured at its lowest possible position along the length of the outer tube section 62 (as viewed in FIG. 3) and the telescoping post assembly 50 is retracted to its shortest possible length, the tubular member 92 can be accepted by an open end of the barrel 32 of a spool 30 having a diameter of about twenty-two inches. Conversely, when the lift assembly 90 is secured at its highest possible position along the length of the outer tube section 62 and the telescoping post assembly 50 is lengthened to its longest possible length, the tubular member 92 can be accepted by an open end of the barrel 32 of a spool 30 having a diameter of about seventy-two inches.

The diameter of the tubular member 92 of the depicted stands 22 and 23 is about 2.0 inches, but a tubular member 92 having a diameter of about 1.5 inches has been found to be satisfactory. Furthermore, the bearing assembly 102 which supports the tubular member 92 is rated for 20,000 pounds, thus enabling the tubular member 92 (and any spool supported thereby) to be rotated relatively smoothly and easily, even for relatively heavy loads (e.g. up to about 6,000 pounds).

Further still and because the floor-engaging base 40 possesses such large length and width dimensions (i.e. at least thirty-six inches by ten inches), the stands 22 and 23 resist tipping over when used to lift a spool 30.

It has been found that a device 20 embodying the aforediscussed features is capable of lifting from the floor 26 a spool 30 weighing up to six thousand pounds and does not have to be anchored in place when used to lift a spool 30.

It will be understood that numerous modifications and substitutions can be had to the aforedescribed embodiment 20 without departing from the spirit of the invention. For example, although the screw jack assembly 70 has been shown and described as being mounted at one end (i.e. the top) of the telescoping post assembly 50, stands which embody features of the invention can employ a screw jack assembly which has been mounted upon a side of the post assembly 50.

Figure 8:
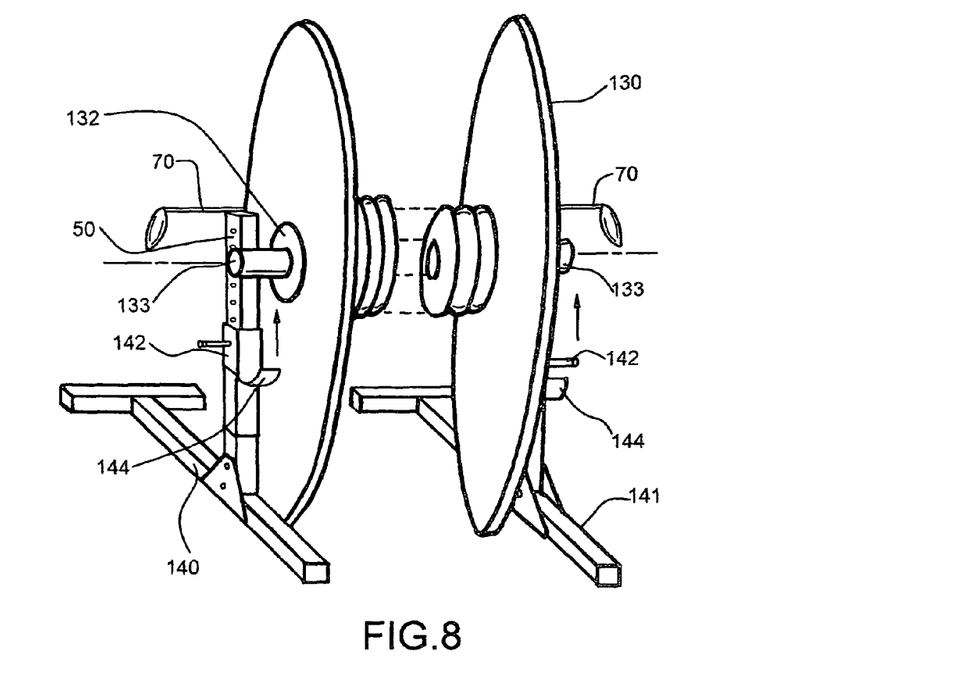
FIG. 8 is a perspective view of an alternative pair of stands within which features of the invention are embodied and shown in position for lifting a spool from the floor.

Furthermore and although each spool-engaging (e.g. tubular) member 92 of the lift assembly 90 of the depicted stands 22 and 23 has been shown and described as being cylindrical in form, such spool-engaging members can take alternative forms. For example, there is illustrated in FIG. 8 a spool 130 having a centrally-disposed barrel 132 having ends 133 which protrude axially outwardly of the spool barrel 132. For purposes of lifting and supporting such protruding barrel ends 133, there is also shown in FIG. 8 a pair of stands 140, 141 which each employ a telescoping post assembly 50 and a lift assembly 142 having a substantially U-shaped bracket 144 which is supportedly attached to the telescoping post assembly 50 in a manner comparable to the manner in which the lift assembly 90 is supportedly attached to the post assembly 50 of the stands 22 and 23 of FIGS. 1-6. Within each of the depicted stands 140 or 141 of FIG. 8, the U shape of the U-shaped bracket 144 opens substantially upwardly and can be positioned beneath a protruding end 133 of the spool barrel 132 so that when raised by way of a screw jack assembly 70 of the stand 140 or 141, the U of the U-shaped form of the bracket 144 acts as a cradle which nestingly accepts the protruding barrel end 133. A continued raising of the bracket 144 by the jack screw 70 lifts the spool 130 from the underlying floor 26 as the weight of the spool 130 rests upon the U-shaped brackets 144.

Figure 9:
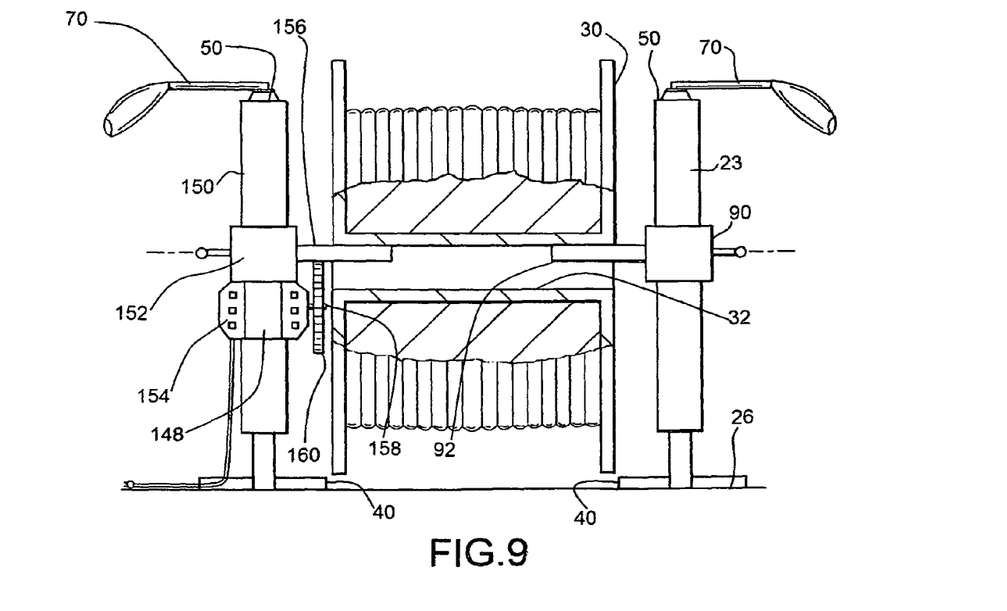
FIG. 9 is a front elevation view of an alternative two-stand apparatus within which features of the present invention are embodied shown being used to support a spool of windable material above a floor.

Further still, although the aforedescribed stands 22 and 23 have been shown and described as including a lift assembly 90 whose tubular member 92 is supported by a bearing assembly 102 to facilitate the manual rotation of a spool 30 supported upon the lift assembly 90, a motor (e.g. an electric motor) can be associated with the lift assembly 90 for forcibly rotating the tubular member 92 so that the spool 30 supported upon the lift assembly 90 is rotated thereby. For example, there is depicted in FIG. 9, a stand 150 having a telescoping post assembly 50, a lift assembly 152 supported upon the post assembly 50 and an electric motor 154 which is supported (e.g. by way of a bracket 148) upon the post assembly 50 adjacent the lift assembly 152. The lift assembly 152 has a cylindrical tubular member 156 which is mounted for rotation (within the remainder of the lift assembly 152) about its longitudinal axis, and the motor 154 has a drive shaft 158 which is connected in drivingly relationship with the tubular member 156 (by way of, for example, a gear member 160) so that actuation of the motor 154 forcibly rotates the tubular member 156 about its longitudinal axis. Therefore and when a spool 30 is supported at one end by the tubular member 156 and the tubular member 156 is rotated by the motor 154, the spool 30, in turn, is rotated about the longitudinal axis of its barrel 32.

Accordingly, the aforedescribed embodiment 20 is intended for the purpose of illustration and not as limitation.

The invention claimed is:

1. Apparatus for lifting and supporting an item from an underlying floor wherein the item includes a centrally-disposed barrel having two opposite ends and about which a windable material is either wound or can be wound and wherein the centrally-disposed barrel of the item is accessible at its opposite ends, said apparatus comprising:
 a pair of supports wherein each support includes
 a) a floor-engaging base;
 b) an elongated telescoping post assembly having two opposite ends, an inner tube section which provides one end of the two opposite ends of the post assembly and an outer tube section which provides the other of the two opposite ends of the post assembly wherein one of the two opposite ends of the post assembly is connectable to the floor-engaging base for support of the post assembly in a substantially vertical orientation with respect thereto and wherein the inner and outer tube sections are movable with respect to one another to alter the spaced distance between the two opposite ends of the telescoping post assembly; and
 c) a lift assembly which is connected to the other of the two opposite ends of the post assembly and which is cooperable with a corresponding end of the barrel of the item so that when the support supports the item, at least a portion of the weight of the item rests upon the lift assembly, and wherein each lift assembly includes an elongated tubular member for supporting a corresponding accessible end of the barrel of the item and has a longitudinal axis, and each lift assembly includes means for supporting its elongated tubular member for rotation about its longitudinal axis so that as the at least a portion of the weight of the item rests upon the lift assembly by way of the elongated tubular member, any rotation of the barrel during a winding of the windable material about the item or an unwinding of the windable material from the item is, by virtue of the permitted rotation of the elongated tubular member about its longitudinal axis, facilitated by the elongated tubular member; and
 d) means for moving the inner and outer tube sections of the telescoping post assembly relative to one another so that the two opposite ends of the post assembly are moved further apart
 so that by positioning each of the supports adjacent a corresponding end of the barrel of the item, arranging the lift assemblies of the supports in cooperating relationship with the barrel of the item so that when lifted by the supports, the weight of the item rests upon the lift assemblies, and then moving the inner and outer tube sections relative to one another so that the opposite ends of the telescoping post assembly are moved further apart, the item is lifted from the floor by way of the lift assemblies; and
 wherein the other of the two opposite ends of the post assembly has a length and the apparatus further includes means for releasably securing the lift assembly at alternative locations along the length of the other of the two opposite ends of the post assembly; and
 wherein the other of the two opposite ends of the post assembly has a side member along which a series of indentations are defined, the lift assembly includes a pin which is mounted for movement into and out of an indentation of the series of indentations to either secure the lift assembly to the other of the two opposite ends of the post assembly or release the lift assembly from the other of the two opposite ends of the post assembly to accommodate the movement of the lift assembly along the length of the other of the two opposite ends of the post assembly for securement of the lift assembly to the other of the two opposite ends of the post assembly at an alternate location therealong.

2. The apparatus as defined in claim 1 wherein the telescoping post assembly is pivotally connected to the floor-engaging base for movement of the telescoping post assembly with respect thereto between a position for use and a position for storage.

3. The apparatus as defined in claim 2 wherein the floor-engaging base includes a pair of plates between which the one of the two opposite ends of the post assembly is positioned and pivotally secured for pivotal movement of the post assembly between a position of use at which the post assembly is arranged substantially vertically with respect to the floor-engaging base and a position for storage at which the support is arranged in a relatively compact arrangement, and each support further includes means for selectively securing the telescoping post assembly in either its position of use or its position for storage.

4. The apparatus as defined in claim 3 wherein the pair of plates defines two sets of aligned openings, the telescoping post assembly defines an opening which is positioned in registry with one of the two sets of aligned openings when the telescoping post assembly is pivoted relative to the floor-engaging base to its position of use and which is positioned in registry with the other of the two sets of aligned openings when the telescoping post assembly is pivoted relative to the floor-engaging base to its position for storage, and the means for selectively securing includes a pin which can be directed through one or the other sets of aligned openings defined in the pair of plates for securing the telescoping post assembly in either its position of use or its position for storage.

5. The apparatus as defined in claim 1 wherein the centrally-disposed barrel of the item is hollow at its opposite ends and wherein the elongated tubular member of each lift assembly is sized to be accepted endwise by a corresponding hollow end of the barrel of the item.

6. The apparatus as defined in claim 1 further including means for rotating at least one elongated tubular member of the lift assemblies about its longitudinal axis and thereby rotate the item during a material winding or unwinding process.

7. The apparatus as defined in claim 1 wherein the lift assembly includes means for biasing the pin into an indentation as aforesaid.

8. The apparatus as defined in claim 1 wherein the base includes a first elongated member and a second elongated member which are joined together to form a "T".

9. The apparatus as defined in claim 8 wherein the first elongated member is at least about thirty-six inches in length, and the second elongated member is at least about ten inches in length, and the telescoping tube assembly is connected to the first elongated member at a location disposed along the length thereof.

10. The apparatus as defined in claim 1 wherein the means for moving includes a screw jack assembly which is interposed between the inner and outer tube sections so that upon manipulation of the screw jack assembly, the opposite ends of the post assembly can be moved toward and away from one another to alter the spaced distance between the opposite ends of the post assembly.

11. Apparatus for lifting and supporting an item above a floor wherein the item has two opposite sides and includes an elongated barrel about which a windable material can be wound or unwound and wherein the barrel is accessible at each end of the two opposite sides of the item, and the item is arranged upon an underlying floor so that the longitudinal axis of the barrel is oriented substantially parallel to the floor, said apparatus comprising:

a pair of supports wherein each support includes
  a) a floor-engaging base adapted to overlie the floor;
  b) an elongated telescoping post assembly having two opposite ends, an inner tube section which provides one end of the two opposite ends of the post assembly and an outer tube section which provides the other of the two opposite ends of the post assembly wherein one of the two opposite ends of the post assembly is connectable to the floor-engaging base for support of the post assembly in a substantially vertical orientation with respect thereto and wherein the inner and outer tube sections are telescopically movable with respect to one another to alter the spaced distance between the two opposite ends of the telescoping post assembly;
  c) a lift assembly which is connected to the other of the two opposite ends of the post assemblies and which is cooperable with the barrel of the item on a corresponding side thereof so that when the support supports the item above the floor, at least a portion of the weight of the item rests upon the lift assembly, wherein each lift assembly includes an elongated tubular member for supporting a corresponding accessible end of the barrel of the item and has a longitudinal axis, and each lift assembly includes means for supporting its elongated tubular member for rotation about its longitudinal axis so that as the at least a portion of the weight of the item rests upon the lift assembly by way of the elongated tubular member, any rotation of the barrel during an operation which winds the windable material about the item or unwinds the windable material from the item is, by virtue of the permitted rotation of the elongated tubular member about its longitudinal axis, facilitated by the elongated tubular member;
  d) means for releasably securing the lift assembly at alternative locations along the length of the other of the opposite tube sections; and
  e) a screw jack assembly which is interposed between the inner and outer tube sections so that upon manipulation of the screw jack assembly, the opposite ends of the post assembly can be moved toward and away from one another to alter the spaced distance between the opposite ends of the post assembly
so that by positioning each of the supports adjacent the barrel of the item on a corresponding side thereof, arranging the lift assemblies of the supports in cooperating relationship with the barrel of the item so that when lifted by the supports, the weight of the item rests upon the lift assemblies, and then manipulating the screw jack assembly so that the opposite ends of the telescoping post assembly are moved further apart, the item is lifted from the floor by way of the lift assemblies; and
wherein the other of the two opposite ends of the post assembly has a length and a side member along which a series of indentations are defined; and wherein the means for releasably securing the lift assembly at alternative locations along the length of the other of the two opposite ends of the cost assembly includes a pin which is associated with the lift assembly and is mounted for movement into and out of an indentation of the series of indentations to either secure the lift assembly to the other of the two opposite ends of the post assembly or release the lift assembly from the other of the two opposite ends of the post assembly to accommodate the movement of the lift assembly along the length of the other of the two opposite ends of the post assembly for securement of the lift assembly to the other of the two opposite ends of the post assembly at an alternate location therealong.

12. The apparatus as defined in claim 11 wherein the telescoping post assembly is pivotally connected to the floor-engaging base for movement of the telescoping post assembly with respect thereto between a position for use at which the post assembly is arranged substantially vertically with respect to the floor-engaging base and a position for storage at which the stand is arranged in a relatively compact arrangement, and each stand further includes means for selectively securing the telescoping post assembly in either its position of use or its position for storage.

13. The apparatus as defined in claim 11 wherein the elongated barrel of the item has two opposite hollow ends on the two opposite sides of the item and wherein the elongated tubular member of each lift assembly is sized to be accepted endwise by a corresponding hollow end of the barrel of the item.

14. The apparatus as defined in claim 11 when the floor-engaging base has a length which measures at least thirty-six inches and a width which measures at least ten inches.

15. Apparatus for lifting and supporting an item from an underlying floor wherein the item includes a centrally-disposed barrel having two opposite ends and about which a windable material is either wound or can be wound, said apparatus comprising:

a pair of supports wherein each support includes
  a) a floor-engaging base;
  b) an elongated telescoping post assembly having two opposite ends, an inner tube section which provides one end of the two opposite ends of the post assembly and an outer tube section which provides the other of the two opposite ends of the post assembly wherein one of the two opposite ends of the post assembly is connectable to the floor-engaging base for support of the post assembly in a substantially vertical orientation with respect thereto and wherein the inner and outer tube sections are movable with respect to one another to alter the spaced distance between the two opposite ends of the telescoping post assembly, and wherein the telescoping post assembly is pivotally connected to the floor-engaging base for movement of the telescoping post assembly with respect thereto between a position of use and a position for storage; and
  c) a lift assembly which is connected to the other of the two opposite ends of the post assembly and which is cooperable with a corresponding end of the barrel of the item so that when the support supports the item, at least a portion of the weight of the item rests upon the lift assembly; and
  d) means for moving the inner and outer tube sections of the telescoping post assembly relative to one another so that the two opposite ends of the post assembly are moved further apart so that by positioning each of the supports adjacent a corresponding end of the barrel of the item, arranging the lift assemblies of the supports in cooperating relationship with the barrel of the item so that when lifted by the supports, the weight of the item rests upon the lift assemblies, and then moving the inner and outer tube sections relative to one another so that the opposite ends of the telescoping post assembly are moved further apart, the item is lifted from the floor by way of the lift assemblies.

16. Apparatus for lifting and supporting an item above a floor wherein the item has two opposite sides and includes an elongated barrel about which a windable material can be wound or unwound and wherein the barrel is accessible at each end of the two opposite sides of the item, and the item is arranged upon an underlying floor so that the longitudinal axis of the barrel is oriented substantially parallel to the floor, said apparatus comprising:
 a pair of supports wherein each support includes
 a) a floor-engaging base adapted to overlie the floor;
 b) an elongated telescoping post assembly having two opposite ends, an inner tube section which provides one end of the two opposite ends of the post assembly and an outer tube section which provides the other of the two opposite ends of the post assembly wherein one of the two opposite ends of the post assembly is connectable to the floor-engaging base for support of the post assembly in a substantially vertical orientation with respect thereto and wherein the inner and outer tube sections are telescopically movable with respect to one another to alter the spaced distance between the two opposite ends of the telescoping post assembly;
 c) a lift assembly which is connected to the other of the two opposite ends of the post assemblies and which is cooperable with the barrel of the item on a corresponding side thereof so that when the support supports the item above the floor, at least a portion of the weight of the item rests upon the lift assembly;
 d) means for releasably securing the lift assembly at alternative locations along the length of the other of the opposite tube sections; and
 e) a screw jack assembly which is interposed between the inner and outer tube sections so that upon manipulation of the screw jack assembly, the opposite ends of the post assembly can be moved toward and away from one another to alter the spaced distance between the opposite ends of the post assembly
 so that by positioning each of the supports adjacent the barrel of the item on a corresponding side thereof, arranging the lift assemblies of the supports in cooperating relationship with the barrel of the item so that when lifted by the supports, the weight of the item rests upon the lift assemblies, and then manipulating the screw jack assembly so that the opposite ends of the telescoping post assembly are moved further apart, the item is lifted from the floor by way of the lift assemblies; and
 wherein the telescoping post assembly is pivotally connected to the floor-engaging base for movement of the telescoping post assembly with respect thereto between a position for use at which the post assembly is arranged substantially vertically with respect to the floor-engaging base and a position for storage at which the support is arranged in a relatively compact arrangement, and each support further includes means for selectively securing the telescoping post assembly in either its position of use or its position for storage.

17. The apparatus as defined in claim 16 wherein the elongated barrel of the item includes a protuberance which extends axially of the barrel at which each of the two opposite sides of the item and each lift assembly includes means for cradling a corresponding protuberance of the barrel so that when the stand supports the item above the floor, at least a portion of the weight of the item rests upon the cradling means of the lift assembly.

18. The apparatus as defined in claim 16 wherein the lift assembly of at least one stand includes a component which is positionable in driving relationship with the item and the apparatus further includes means for rotating said component to thereby rotate the item during a material winding or unwinding or unwinding process.

* * * * *